US005925293A

United States Patent [19]

Howk

[11] Patent Number: 5,925,293

[45] Date of Patent: Jul. 20, 1999

[54] MIXER SPARGING APPARATUS

[75] Inventor: Richard A. Howk, Pittsford, N.Y.

[73] Assignee: General Signal Corporation, Rochester, N.Y.

[21] Appl. No.: 08/895,483

[22] Filed: Jul. 16, 1997

Related U.S. Application Data

[60] Provisional application No. 60/025,497, Oct. 4, 1996.

[51] Int. Cl.[6] .................... B01D 47/16

[52] U.S. Cl. .................... 261/93; 261/123; 261/124

[58] Field of Search .................... 261/93, 123, 124, 261/121.1, 126; 210/220, 219

[56] References Cited

U.S. PATENT DOCUMENTS

| | | | |
|---|---|---|---|
| 1,776,032 | 9/1930 | Kobernik . | |
| 2,293,183 | 8/1942 | Walker . | |
| 2,482,908 | 9/1949 | Hatch et al. . | |
| 2,521,396 | 9/1950 | Moul . | |
| 2,522,947 | 9/1950 | Hatch et al. . | |
| 2,853,280 | 12/1958 | Cusi . | |
| 2,983,652 | 5/1961 | Baerfuss . | |
| 3,628,775 | 12/1971 | McConnell . | |
| 3,744,765 | 7/1973 | Bard . | |
| 3,792,840 | 2/1974 | Sisk et al. | 261/93 |
| 3,814,396 | 6/1974 | DiGregorio et al. | 261/93 |
| 3,875,057 | 4/1975 | Kaelin . | |
| 4,017,565 | 4/1977 | Muller . | |
| 4,066,722 | 1/1978 | Pietruszewski et al. . | |
| 4,070,423 | 1/1978 | Pierce . | |
| 4,117,048 | 9/1978 | Stockner et al. . | |
| 4,193,950 | 3/1980 | Stockner et al. . | |
| 4,249,828 | 2/1981 | Condolios . | |
| 4,290,885 | 9/1981 | Kwak . | |
| 4,521,349 | 6/1985 | Weber et al. . | |
| 4,717,515 | 1/1988 | Forsyth et al. . | |
| 4,750,994 | 6/1988 | Schneider . | |
| 4,960,706 | 10/1990 | Bliem et al. . | |
| 4,961,854 | 10/1990 | Wittmann et al. . | |
| 5,006,283 | 4/1991 | Schutte et al. | 261/93 |
| 5,034,165 | 7/1991 | Willinger et al. . | |
| 5,117,141 | 5/1992 | Hawsey et al. . | |
| 5,318,360 | 6/1994 | Langer et al. . | |
| 5,389,310 | 2/1995 | Leiponen . | |
| 5,429,808 | 7/1995 | Kuroda et al. . | |
| 5,511,881 | 4/1996 | Post et al. . | |

FOREIGN PATENT DOCUMENTS

| | | | |
|---|---|---|---|
| 1176930 | 9/1985 | Russian Federation | 261/93 |

*Primary Examiner*—Jay H. Woo
*Assistant Examiner*—Robert Hopkins
*Attorney, Agent, or Firm*—M. Lukacher

[57] ABSTRACT

In order to efficiently mass transfer from gas, particularly air, into liquid or liquid suspensions with enhanced efficiency in terms of the mass of the gas transferred to the liquid, the gas is released or sparged through a plurality of open pipes which are disposed in a space between the bottom of the tank containing the liquid or liquid suspension and an axial flow impeller which creates a flow path downwardly past the outlet ends of the pipes. Turbulence is enhanced even though the air leaves the pipes at low velocity rather than in a jet through the use of a Bernoulli air trapping ring and plates. The ring and plates encounter the flow produced by the axial flow impeller successively. The ring distributes the air and assists in defining a low pressure region below the ring. A low pressure region also is defined by the plates on the underside thereof. The underside of the plates is in the vicinity of the outlets of the pipes. Distribution fins taper away from the outlet and provide for a spacial distribution of the low pressure gas. The low pressure air may exit the outlets of the pipes at a pressure of a few PSI greater than the liquid pressure at the outlets which may be in the range of 10% greater pressure than the liquid pressure at these outlets. The plates, especially at their edges, provide turbulence in the liquid flow to facilitate transfer of the mass of the gas to the liquid.

23 Claims, 3 Drawing Sheets

MIXER SPARGING APPARATUS

The application claims the priority benefit of provisional application Ser. No. 60/025,497 filed Oct. 4, 1996.

DESCRIPTION

The present invention relates to systems for gas dispersion in liquids or liquid suspensions as the suspensions are circulated, and particularly to an improved mass transfer mixing system, which may also be called mixer sparging apparatus, with enhanced gas to liquid mass transfer efficiency (the rate at which the mass of the gas is dissolved into the liquid).

The invention provides a gas outlet arrangement wherein gas at low pressure (for example, within about 10% of the pressure of the liquid at the outlets) is released between a pairs of fins and below a plate in a flow path which may be provided by an axial flow impeller. The arrangement turbilizes the liquid flow for enhanced gas to liquid mass transfer and enables the use of a pipe or pipes which release the gas having outlets which are sufficiently large to be cleaned easily of any accumulated debris. In addition, a ring may be disposed such that the outlets are arranged below the ring and the plates are between each of the outlets and the ring. The ring enhances the distribution of the gas in the path of the axial discharge (flow) from the impeller. The ring may be circular in cross-section to provide a reduce pressure on the side thereof which is downstream of the flow so as to further enhance the distribution of the flow, due to the Bernoulli effect. The ring may then be called the Bernoulli air trapping ring.

The sparging device including the pipes, plates, fins and, ring (if the ring is used) is disposed in the vicinity of the bottom of the mixing tank, for example between 0.25 and 0.5D (where D is the diameter of the impeller). This locates the sparging apparatus above the region of the tank where solids may accumulate and also enhances the turbilization of the flow of the liquid and the distribution of the gas. Thus, the invention provides an improved fluid (gas or liquid) sparging system, which utilizes the discharge of an axial flow impeller to minimize gas droplet size by improving turbulence of the liquid flow and, therefore, the dispersion of the gas thereby enhancing gas to liquid mass transfer. The invention can provide multiple gas outlets and multiple turbulence enhancing elements for increased turbulence and residence time of the gas without flooding of the impeller. As noted above, the sparges may use sparging pipes with effectively open pipes to provide cleanliness and reduce plugging and also for cleanability and maintainability.

Axial flow devices have been developed to handle large amounts of gas in sparging mixers. Axial flow devices produce shear or turbulence which may be limited as compared to shear or turbulence produced by radial flow impellers.

Sparging apparatus, such as sparge rings, which were developed to provide an adequate distribution of gas to the discharge from radial flow impellers do not create sufficient sheer or turbulence in the axial flow discharge resulting in less than optimal gas to liquid mass transfer.

The following U.S. Patents represent generally background technology of sparging. Of these patents only U.S. Pat. No. 4,066,722 shows an axial flow impeller in an open tank. Kwaks, U.S. Pat. No. 4,290,885—September, 1981; Kobernick U.S. Pat. No. 1,776,032—September, 1930; Moul U.S. Pat. No. 2,121,396—September, 1950; McConnell U.S. Pat. No. 3,628,775—December, 1971; Bard, U.S. Pat. No. 3,744,765—July, 1973; Condolios, U.S. Pat. No. 4,249,838—February, 1981; Forsyth, U.S. Pat. No. 4,717,515—January, 1988; Leiponen, U.S. Pat. No. 5,389,310—February, 1995; Langer, U.S. Pat. No. 5,318,360—June, 1994; Post, U.S. Pat. No. 5,511,881—April, 1996; Weber, U.S. Pat. No. 4,521,349—June, 1985; Pietruszewski, U.S. Pat. No. 4,066,722—January, 1978; Schneider, U.S. Pat. No. 4,750,994— June, 1988; Bollenrath, U.S. Pat. No. 4,750,996—June, 1988; and Schutte, U.S. Pat. No. 5,005,283—April, 1991.

The present invention provides an improved mechanism for distributing the gas in the axial discharge flow and takes advantage of the dispersal of the flow energy over a larger area than is the case with radial flow impellers. In axial flow, the flow is parallel to the axis of the shaft which rotates the impeller. Then the gas is dispersed in an opposite direction to the flow produced by the impeller. In the flooded condition, the gas energy overcomes the flow generated by the impeller and effectively stalls the pumping action of the impeller blades. The axial flow impeller is then encapsulated by the gas and is effectively stalled.

The mechanism provided by the invention enables the gas to disperse uniformly without flooding the impeller. This will be designated as the primary stage of the mechanism. Gas primarily released by the sparge must be displaced quickly and effectively due to bubble size and energy. This is accomplished in the mechanism provided by the invention by enabling the gas to be released directly into the discharge flow of the impeller with minimum physical devices to impede and trap the gas.

In contrast, a conventional ring sparge which uniformly distributes the gas around the ring circumference, does not provide sufficient shear into the regions of the tank below the sparge thereby enabling relatively large gas bubbles to escape or to be re-entrained into the flow from the impeller and be subject to circulation through relatively low shear zones of the impeller. The primary stage of the improved sparging mechanism provided by the invention provides enhanced dispersion of the gas to prevent flooding and create mechanical and fluid stability. The primary stage may be provided by one, but preferably by a plurality of pipes having their outlets at about 0.7 to 0.8D where maximum shear is located in flow from an axial flow impeller. The secondary stage provides shear gradients in the flow.

The secondary stage of the mechanism provided by the invention also creates a longer residence time of the gas under the impeller (in the discharge flow) and creates shear zones for the gas. The secondary stage may be provided by plates which present flat surfaces in the discharge from the impeller above the outlets where the gas is discharged. In addition, a ring may be attached along a surface of the flat plate opposite to the surface thereof which faces the outlets of the pipes. This ring further enhances residence time of the gas under the impeller and creates shear zones. The use of a ring has the advantage also of enabling the retrofit of the improved sparging apparatus provided by the invention.

Accordingly, it is the principal object of this invention to provide improved mixer sparging apparatus which affords an open pipe sparger which operates with the same or better performance than a standard ring sparge by incorporating mechanisms for providing improved flow from the impeller through shear zones, as well as improved gas circulation and distribution.

The foregoing other objects and advantages of the invention will become more apparent from a reading of the following description in connection with the accompanying drawings in which.

Figure 1:
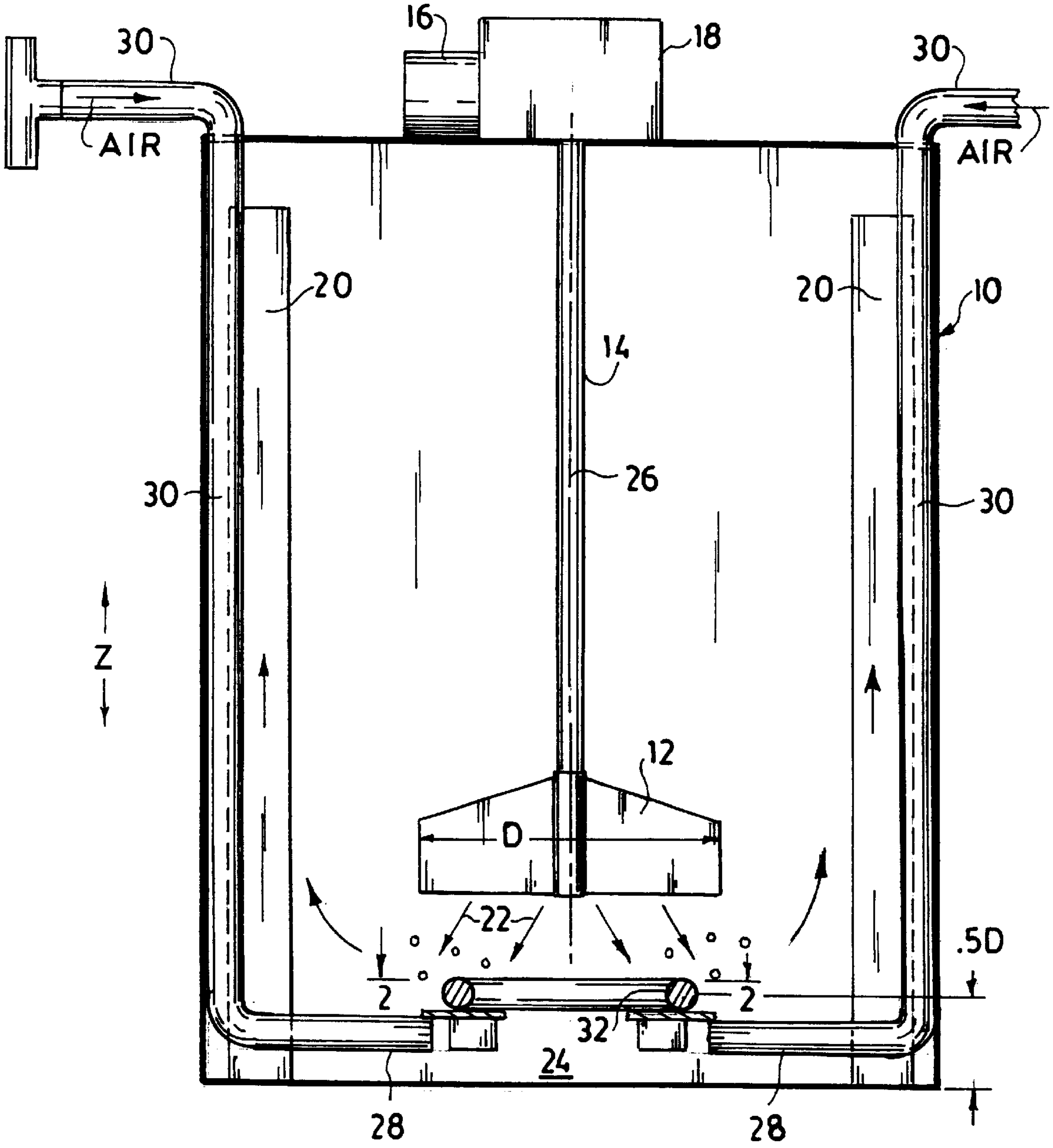
FIG. 1 is a plan view schematically showing a sparging mixer having an improved gas sparging mechanism in accordance with an embodiment of the invention.

Referring to FIG. 1, there is shown a tank which may be a cylindrical tank 10 containing a liquid or liquid suspension into which a fluid (gas, and particularly air), is to be dispersed and dissolved. An axial flow impeller 12, such as the Model A315, sold by Lightnin Mixers a unit of General Signal Corporation, Rochester, N.Y., USA, is driven by a shaft 14 which is driven from an electric motor 16 via a gear box 18. A plurality, say four baffles 20, 90° apart, may be used to direct the axial flow from the impeller. The discharge flow is in the downward direction towards the bottom of the tank as indicated by arrows 22 and recirculates along the wall of the tank. This recirculating flow may also be called the re-entrant flow.

Figure 4:
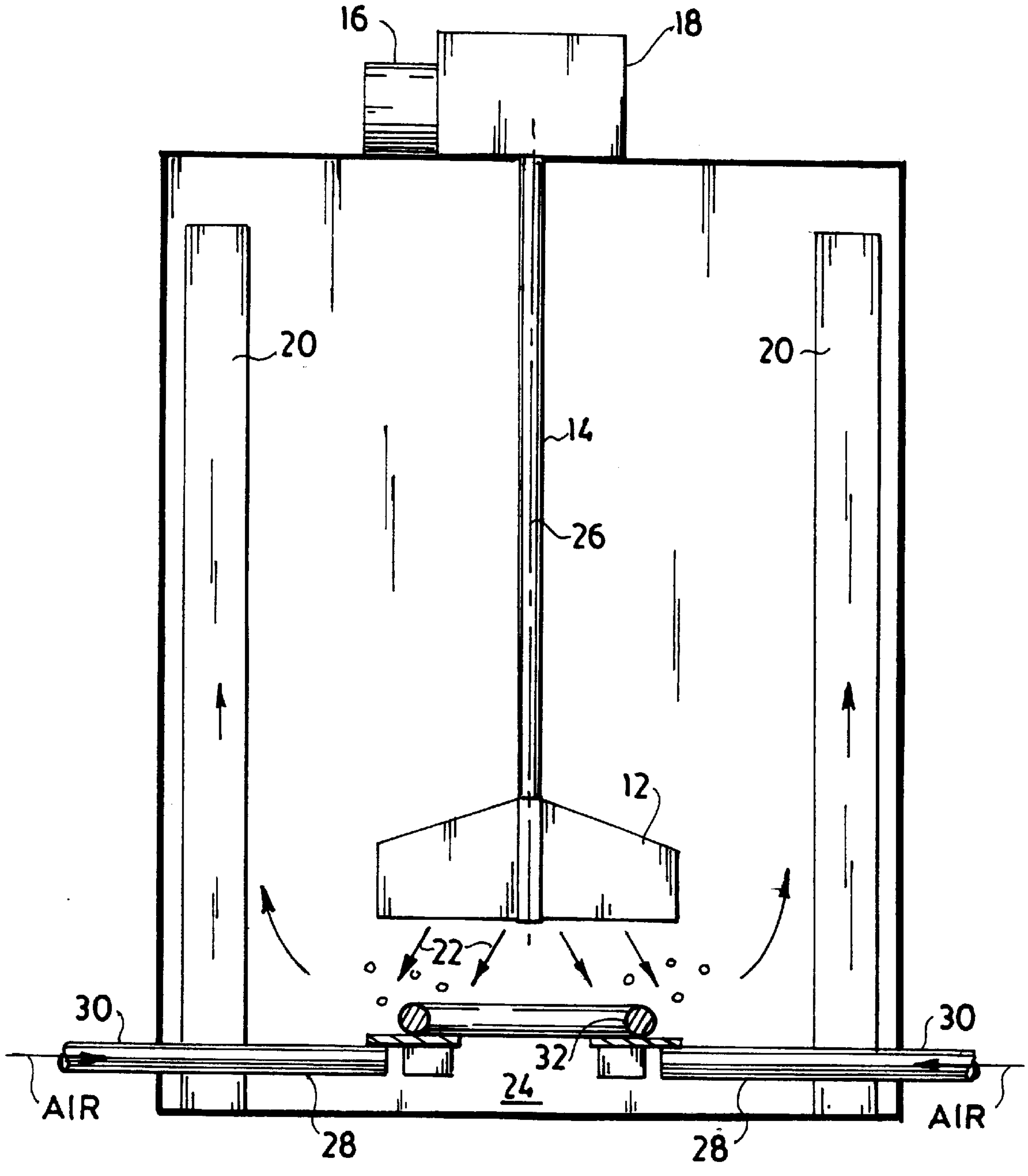
FIG. 4 is a view similar to FIG. 1 showing an alternative embodiment.

The mechanism for sparging, which is provided in accordance with the invention is designated generally by the reference numeral 24. Three such mechanisms 24, (24*a, b* and *c*) are spaced 120° from each other around the axis 26 of the shaft 14. Each mechanism has an air outlet pipe 28. The axis of each pipe may be in the same plane (horizontal which is perpendicular to the axis 26). The pipe outlets may be approximately 0.7 to 0.8D from the axis 26, and from 0.25 to ).5D from the bottom of the tank. Each pipe 28 has its own supply line 30 for air, entering from the top of the tank 10 (FIG. 1) or from the sides of the tank (FIG. 4). The air is supplied at low pressure by which is meant just sufficient pressure over the liquid pressure at the outlets of the pipes 28 to enable the gas to be released. This pressure may be within about a range of 10% over the pressure of the liquid at the outlet ends of the pipes 28. The diameter of the pipes is relatively large and in the example shown by the dimensions indicated in FIG. 1 may be about 4" in diameter. Such a large diameter lends itself to cleanliness and ease of clearing of any residual material which might tend to plug the pipes. The material may be cleaned out by a brush or reaming device when the tank 10 is empty, or even when the tank 10 is full.

Figure 2:
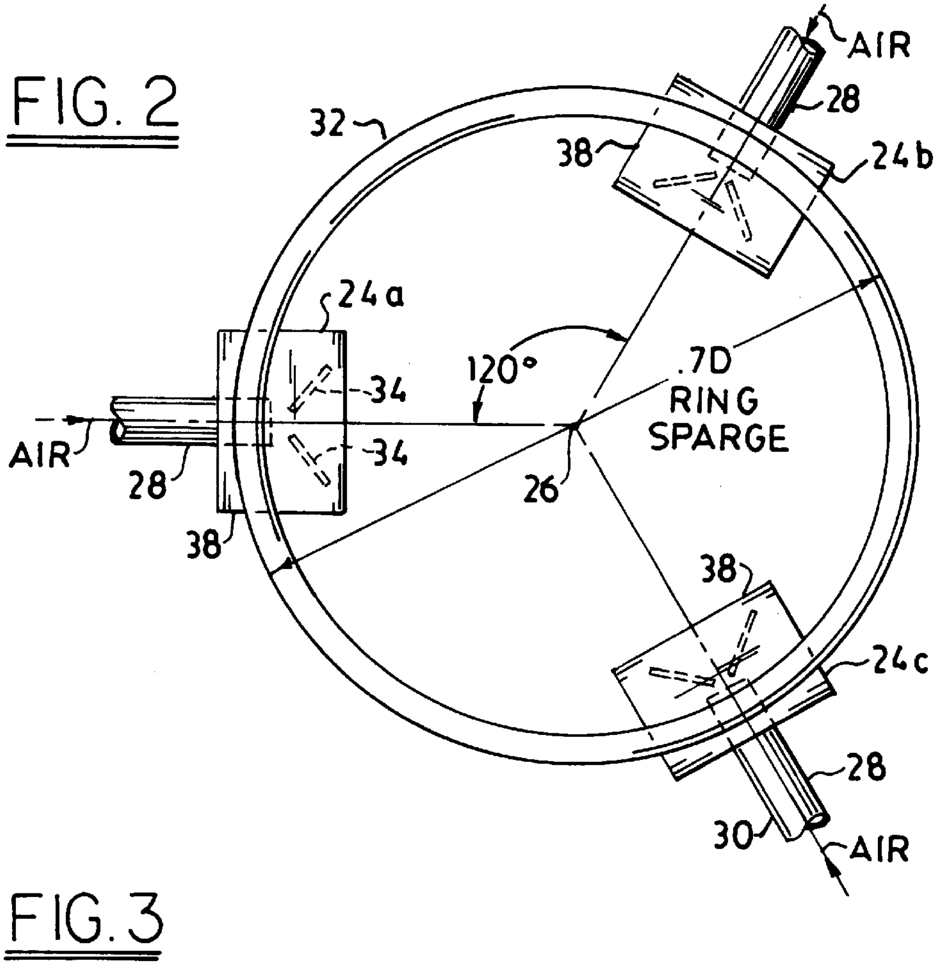
FIG. 2 is a plan view of the improved sparging mechanism taken along the line 2—2 when viewed in the direction of the arrows.

The mechanism also includes a ring 32 which is 0.7 or 0.8D in diameter, where D is the diameter of the impeller 12. The ring may be attached to the tank by a fixture connected either to the bottom of the tank or to the walls of the tank, as is conventional for ring sparges. The ring may be a tube which is entirely enclosed or it may be a solid body. The ring may be a band, but is preferably circular in cross-section so as to enhance the Bernoulli effect which provides a lower pressure in the downstream side of the pipe thereby facilitating the distribution of the gas as it leaves the outlet end of the pipes 28 (see particularly FIG. 2).

Figure 3:
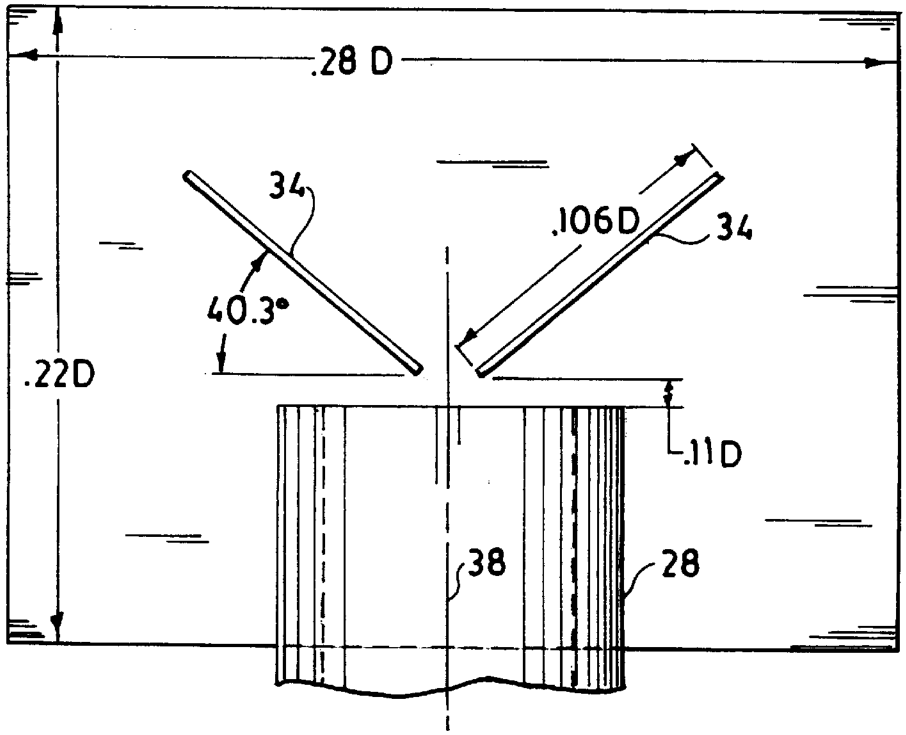
FIG. 3 is a bottom view of a single mechanism for enhanced gas sparging, of the three similar mechanisms which are disposed 120° apart as shown in FIG. 2.

The mechanisms 24*a, b* and *c* each include a pair of fins 34 (see FIG. 3) which are spaced from each other to provide a slit at the center (along the axis 36 of the pipe 28). The fins 34 diverge, for example, at the angle shown in FIG. 3, so as to disperse the gas leaving the pipe. The primary stage of the sparging mechanisms 24, which provide maximum dispersion of the gas and aides in re-entrainment of the gas, rapidly in the primary flow, (downward discharge) from the impeller 12 is provided principally in each mechanism 24 by the pipe 28, the fins 34 and the ring 32. It should be understood that the ring 32 is optional and is preferred since it affords further distribution of the gas and provides a means for supporting the mechanisms 24. The dispersion of the gas reduces the potential for flooding of the impeller as pointed out above.

The secondary stage of the sparging mechanisms is provided by flat plates 38. These plates encompass an area greater than the area encompassed by the fins 34 and the outlet end of the pipe 28. These plates have as their primary function, the turbilization of the flow in the vicinity of the discharging gas. The gas is thus broken into fine bubbles which enhances, facilitates and improves the efficiency of gas to liquid mass transfer.

From the foregoing description, it will be apparent that there has been provided improved sparging apparatus and particularly an improved mechanism whereby gas may be released from an open pipe and yet provide efficient gas to liquid mass transfer in a mixing environment, particularly in an environment provided by an axial flow impeller. Various dimensions and geometrical relationships are indicated in the drawings, for example, as designated by D, which is the diameter of the impeller Z, which is the height of the tank and C, which is the height of the center line of the impeller above the bottom of the tank. These dimensions depend upon the liquid and gas which are being used in the process carried out in the tank and are given for purposes of example and elucidation of the invention. The pipes 28 may be tilted downwardly from the horizontal (say about 5 degrees) so that their outlet ends are below the horizontal, to avoid accumulation of solids in the pipes. Tees may be provided at the bends in the pipes to facilitate cleanout of the pipes. Other variations and modifications in the designs presented herein, including the dimensions may be changed within the scope of the invention, will be apparent to those skilled in the art. Accordingly, the description and dimensions given should not be taken as limiting, but only exemplary.

I claim:

1. Sparging apparatus which comprises an impeller for generating a discharge flow of liquid and a mechanism for releasing a fluid into the flow, the mechanism being disposed between the impeller and the bottom of a tank; the mechanism comprising at least one open pipe having an outlet through which said fluid is discharged at low pressure; fins disposed downstream of said outlet for distributing the fluid; and a plate for turbulizing the discharge flow as the discharge flow passes by said plate into the fluid released via said pipe, said plate being disposed above the outlet of the pipe and the fins.

2. Sparging apparatus according to claim 1 wherein said impeller has an axis of rotation and further comprising a ring concentric with the axis of rotation of the impeller connected in assembled relationship with the plate and the pipe and the fins upstream of the plate in the discharge flow from the impeller.

3. The apparatus of claim 2 wherein said ring is circular in cross section.

4. The apparatus of claim 3 wherein said ring is in the form of a band.

5. The apparatus of claim 3 wherein said ring has a diameter of between 0.7D and 0.8D.

6. The apparatus of claim 5 further including a ring disposed downstream of each of said outlets of said pipes.

7. The apparatus of claim 1 wherein a first region extends between said impeller and said base and second region extends between said first region and said wall, said outlet being in said first region.

8. The apparatus of claim 1 wherein a first region extends between said impeller and said side and second region extends between said first region and said wall, said outlet being in said second region or in said wall adjacent to said second region.

9. The apparatus of claim 1 wherein said tank contains said liquid to a level creating a pressure at said outlet, and wherein said discharge gas pressure at said outlet is about 10% over said pressure created by said level and said gas thereby being discharged at low velocity.

10. The apparatus of claim 6 wherein said ring is circular in cross section.

11. The apparatus of claim 6 wherein said ring is disposed between about 0.25D and 0.5D from the bottom of said tank.

12. The apparatus of claim 6 wherein said ring has a diameter of between 0.7D and 0.8D.

13. Apparatus for dispersion of gas into a liquid medium, comprising:

a tank formed by a wall and a base closing said tank at an end thereof, an axial-flow impeller within said tank producing flow in opposite directions, one of said directions being toward said base and the other of said directions being along said wall, said impeller being spaced from said base, a pipe between said base and said impeller, having an outlet to discharge gas into said tank, a pair of fins disposed downstream of said outlet, said fins defining a slit there between and adapted to disperse gas within said tank, and a plate disposed adjacent said outlet and surrounded by said flow towards said base, said plate being disposed between said pipe and said impeller and encompassing an area greater than the area encompassed by said fins and said outlet.

14. The apparatus of claim 13 further including a ring disposed downstream of said outlet of said pipe.

15. The apparatus of claim 13 wherein said outlet of said pipe defines a plane and said fins form an angle of approximately 40 degrees from said plane.

16. The apparatus of claim 14 wherein said ring is disposed between about 0.25D and 0.5D from said side of said tank.

17. The apparatus of claim 13 wherein said outlet is located at about 0.7D to 0.8D from said side of said tank.

18. The apparatus according to claim 13 wherein said pipe is disposed so that gas flows from said outlet in the direction along said base.

19. An apparatus for dispersion of gas in a liquid medium tank having a wall and a bottom at an end thereof comprising:

an axial flow impeller within said tank, said impeller having a diameter D and an axis of rotation, three pipes, each pipe having an outlet adapted to discharge gas into said tank, said pipes spaced 120 degrees from each other around said axis of rotation of said impeller, a pair of fins disposed downstream of each said outlet, said fins adapted to disperse the gas within said tank, and a plate disposed adjacent each said outlet, between each said pipe and said impeller surrounded by said flow, and encompassing an area greater than the area encompassed by each pair of said fins and each said outlet.

20. The apparatus of claim 19 wherein said outlet of said pipes each have an axis, and each fin of each of said pairs of fins forms an angle of approximately 40° with respect to each said axis of each of said pipes.

21. The apparatus of claim 19 wherein each of said outlets is located at about 0.7D to 0.8D from said axis of rotation of said impeller.

22. A method of dispersing gas in a tank containing liquid, comprising of the steps of:

rotating an axial flow impeller within said tank to cause the liquid to move within the tank, discharging gas into said tank through an outlet, dispersing the gas within said tank by flowing said gas past a pair of fins disposed downstream of said outlet, and turbilizing the flow of liquid in the vicinity of said outlet by providing a plate adjacent said outlet, said plate encompassing an area greater than the area encompassed by said fins and said outlet.

23. The method according to claim 22 whereas said discharging step is carried out with said gas at low discharge pressure about sufficient only to overcome the pressure of the liquid at said outlet.

* * * * *